Figure 8:
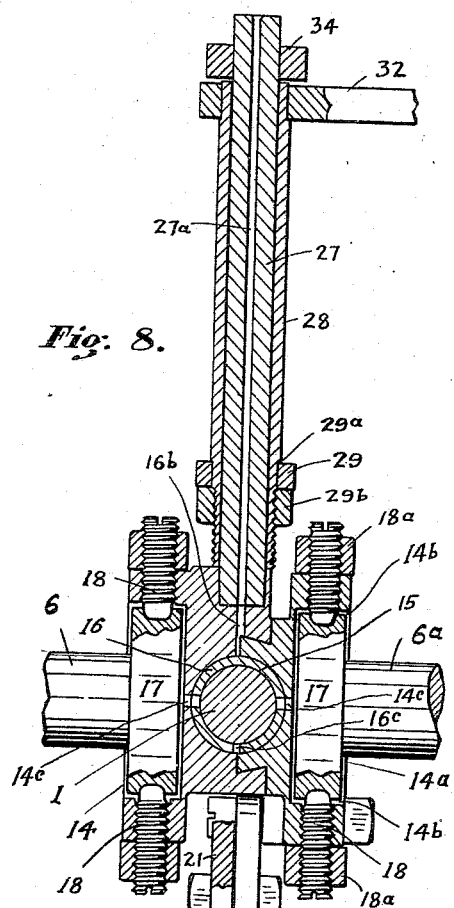

J. W. KETTERMAN.
TRANSMISSION DEVICE.
APPLICATION FILED SEPT. 15, 1910.
995,152.
Patented June 13, 1911.
3 SHEETS—SHEET 1.
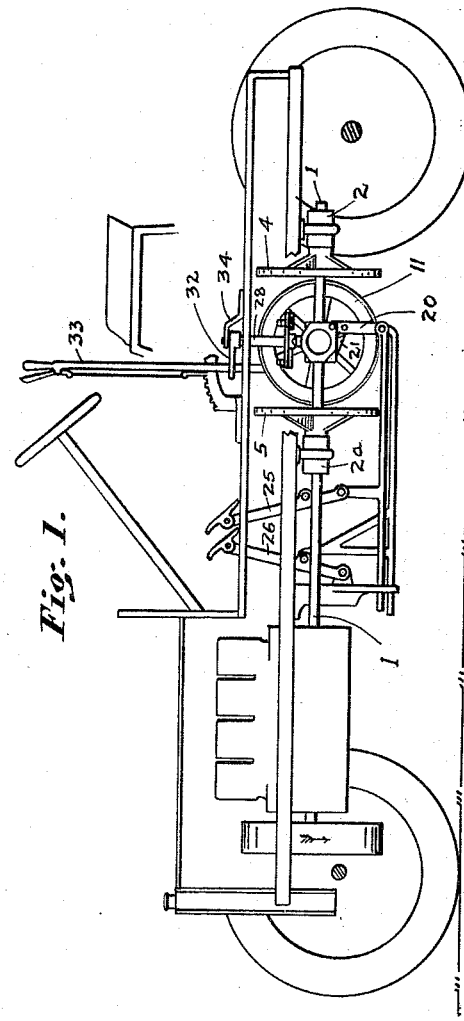
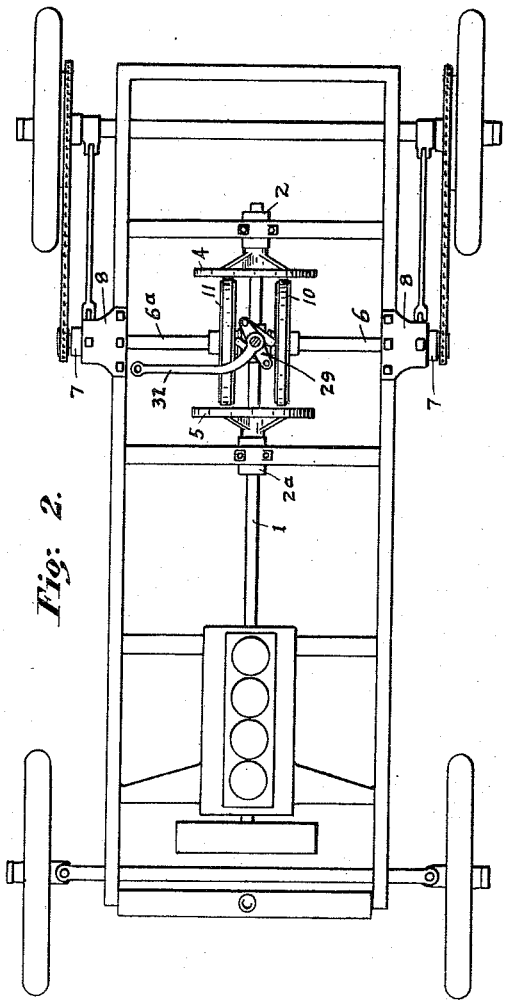
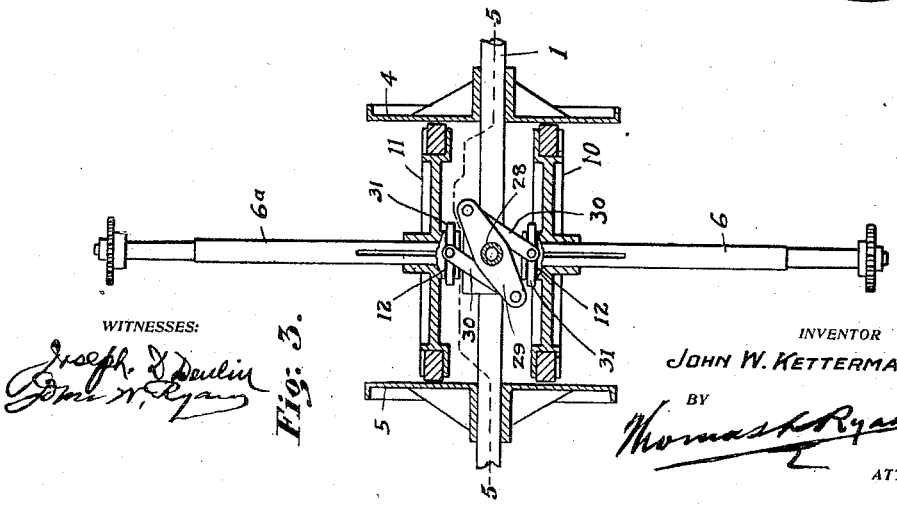
INVENTOR
JOHN W. KETTERMAN
BY
ATTORNEY J. W. KETTERMAN.
TRANSMISSION DEVICE.
APPLICATION FILED SEPT. 15, 1910.
995,152.
Patented June 13, 1911.
3 SHEETS—SHEET 2.
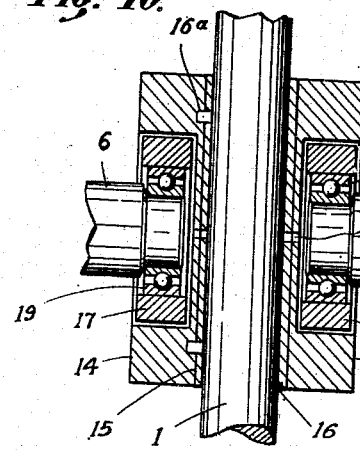
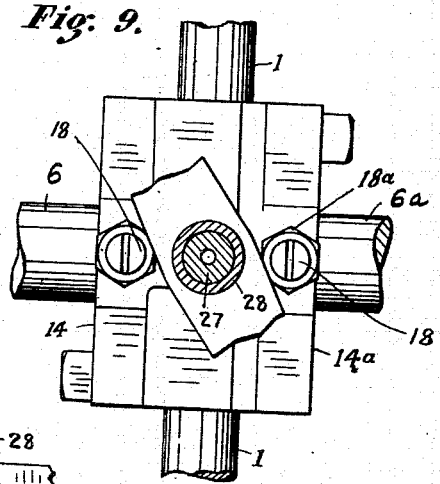
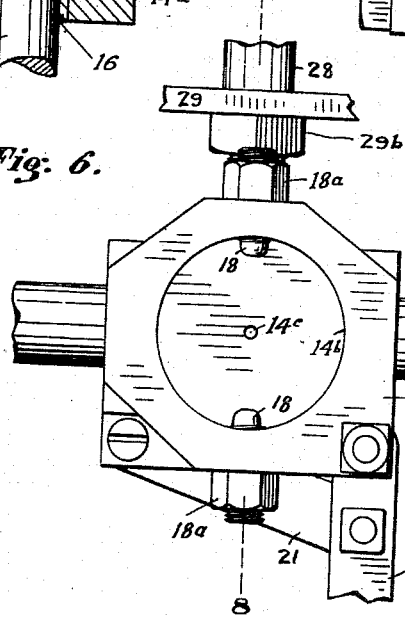
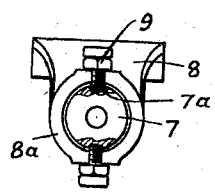
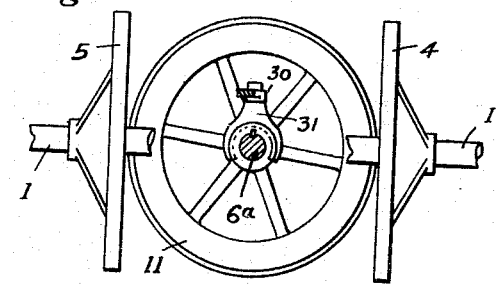
WITNESSES:
Joseph D. Devlin
John M. Ryan
INVENTOR
JOHN W. KETTERMAN.
BY
Thomas L. Ryan
ATTORNEY
THE NORRIS PETERS CO., WASHINGTON, D. C.

J. W. KETTERMAN.
TRANSMISSION DEVICE.
APPLICATION FILED SEPT. 15, 1910.

995,152.

Patented June 13, 1911.

3 SHEETS—SHEET 3.

WITNESSES:
Joseph D. Devlin
John M. Ryan

INVENTOR
JOHN W. KETTERMAN.
BY
Thomas L. Ryan
ATTORNEY

UNITED STATES PATENT OFFICE.

JOHN W. KETTERMAN, OF MUNCIE, INDIANA.

TRANSMISSION DEVICE.

995,152.　　　　Specification of Letters Patent.　　Patented June 13, 1911.

Application filed September 15, 1910. Serial No. 582,172.

*To all whom it may concern:*

Be it known that I, the undersigned, JOHN W. KETTERMAN, a citizen of the United States, residing at Muncie, in the county of Delaware and State of Indiana, have invented certain new and useful Improvements in Transmission Devices, of which the following is a specification.

This invention relates to improvements in friction-transmission devices of that general type wherein the motion is transmitted from the driving shaft to the driven shaft by means of a friction-disk driven by the former and which contacts with the face of the friction wheel carried by the driven shaft.

Objects of my invention are to provide a new combination and arrangement of parts whereby a more positive and dependable transmission of the motion from the driving shaft may be obtained, and which new device will be strong and durable, and will be not liable to get out of order or repair, and which will be easy to manipulate. These general purposes and other more specific objects which will become apparent as the specification of my invention is disclosed, are accomplished by the new construction, combination and arrangement of parts described in this specification, illustrated in the drawings, and defined in the appended claims.

Figure 7:
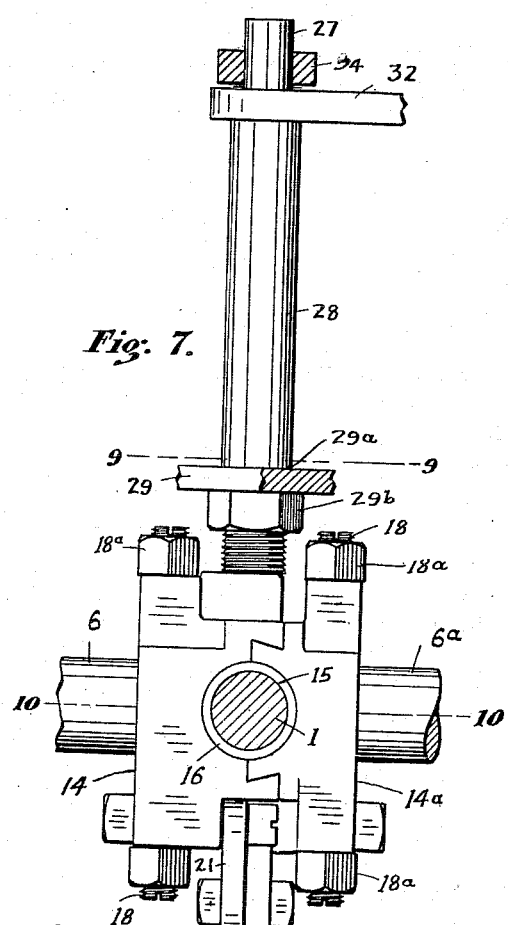
Figure 4:
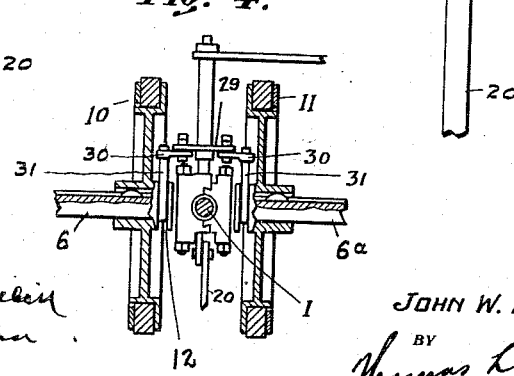

In the drawings Figure 1 is a side view, and Fig. 2 is a plan view of my improved transmission device in operative position, there being shown in said views a sufficient number of parts of the motor-car proper, that the function of the several parts of the invention, and the mode of operation of same may be clearly understood. Fig. 3 is an enlarged sectional plan view of the invention. Fig. 4 is a central transverse sectional view of Fig. 3 the shaft-block and connected parts being shown in elevation and the end portions of the driven shafts being broken away. Fig. 5 is a sectional view taken on the line 5—5 in Fig. 3. Fig. 6 is an enlarged detached side view, and Fig. 7 is an enlarged detached end view of the shaft-block. Fig. 8 is a central transverse sectional view taken on the line 8—8 in Fig. 6. Fig. 9 is a plan view taken on the line 9—9 in Fig. 7. Fig. 10 is a sectional plan view taken on the line 10—10 in Fig. 7. Fig. 11 is a detached sectional view of one of the boxings 7 and its support.

The several parts shown, are indicated by similar characters of reference throughout the several views.

The rear portion of the continuous driving shaft 1 is carried by journal boxes 2 and $2^a$ suitably supported by the transverse frame members shown. 4 and 5 designate opposed friction disks of similar structure and diameter and which are secured at a proper distance apart on the said driving shaft. The inner ends of the shafts 6 and $6^a$ are supported by and journaled in the sides of the shaft-block. Through the functions performed by the several parts of my invention, these shafts are caused to operate jointly thereby having the same speed and direction of movement. This feature and the structure and function of the said shaft block and the manner in which the inner ends of the said shafts 6 and $6^a$ are journaled therein will be hereinafter more specifically described. The outer ends of the shafts 6 and $6^a$ are journaled in the journal boxes 7. These journal boxes 7 are supported by the frame in such manner that the shafts 6 and $6^a$ will have correct bearing therein when in position moved slightly out of true alinement, as well as when they are in true alinement. The detail of construction for the support of these journal boxes 7, is shown in Fig. 11. The member 8 having a ring-portion $8^a$ through which the journal box 7 may be passed is secured to the machine frame. The rounded ends of the cap screws 9, carried by said member 8, will loosely engage the recesses $7^a$ in the opposite sides of the journal-box.

10 and 11 designate friction-wheels. The diameter of these wheels is slightly less than the distance between the faces of the friction-disks so that when the shafts 6 and $6^a$ are being maintained in alinement, there will be no contact of the friction wheels and the friction disks. These friction wheels are feathered on the shafts 6 and $6^a$ so that they may be moved longitudinally but not rotatively thereon. The inner end of the hub of each of the friction wheels is provided with an annular groove 12, as plainly shown in Figs. 3 and 4.

To sustain the ends of the shafts 6 and $6^a$ and to support the means for varying the positions of the friction wheels on the said shafts, and for the moving of the wheels into and out of contact with the friction disks, I have devised the construction included in the shaft block and connected parts, as plainly shown in the drawings. This shaft block is composed of two parts, namely 14 and 14ª, held united against separation but movable slidingly upon each other. The preferred construction is the dovetail jointure shown. In the central bore 15 is retained a bushing 16 of bronze or other suitable metal to form a bearing on the driving shaft 1. The studs 16ª which engage recesses therefor in the body of the shaft block will hold this bushing against longitudinal displacement. In each of the sides of this shaft block are circular recesses 14ᵇ. In each of said recesses a bearing ring 17 is retained by cap screws 18 held by the lock nuts 18ª. The rounded ends of these cap screws fit in recesses in the peripheral faces of the bearing ring whereby the latter is supported pivotally. Suitable ball races 19 constitute bearings in the said bearing rings, for the inner ends of the shafts 6 and 6ª.

20 designates a shift bar having its end pivotally connected to the lower side of one of the parts of the shaft block, namely the part 14ª. At a point near said end of the shift bar is pivotally connected the end of the bar 21 which has its other end connected to the lower side of the part 14. By this arrangement, when either of said parts 14 or 14ª are held, the moving of the shift bar will cause the relative positions of the said parts of the shaft block, to be changed, the ends of the shafts 6 and 6ª being shifted in opposite directions. By foot levers 25 and 26 which have suitable connections with the shift bar 20, the operator may move the latter in either direction, and accordingly may bring the friction wheels 10 and 11 into and out of engagement with the disks 4 and 5. To shift the friction wheels toward or apart from each other whereby the speed of movement of the driven shafts 6 and 6ª is varied, is the function of the several parts supported by the shaft block and which I will now describe.

27 designates an upright which has its lower end secured in the top of the shaft block. A sleeve 28 having a bore of proper diameter is slipped down over the upright, its lower end resting on the top of the shaft block. On the threaded lower end of this sleeve a cross arm 29 is screwed up to engagement with the shoulder 29ª; and the lock nut 29ᵇ will secure the cross arm in such position on the sleeve.

30 and 30 designate links which loosely connect the ends of the cross arm to the heads of the yokes 31. These yokes are of the general construction as shown in Fig. 5 and fit loosely in the grooves 12 of the hubs of the friction wheels. An arm 32 has its end secured to the upper portion of the sleeve 28 and its free end is engaged by a hand control-lever 33. The upper end of the upright 27 is sustained in position by a stay member 34 which has suitable connections with the machine frame.

With the driving disks arranged as shown, and the two friction wheels arranged between them and at a right angle thereto and capable of being manipulated into and out of frictional engagement with said disks, it is possible to obtain through gearing a frictional transmission of the power to operate the shafts 6 and 6ª in either a forward or rearward direction. Change of the speed of movement of the shafts is accomplished by varying the distance between the friction wheels.

When the parts are in the neutral or inoperative position as shown in Fig. 2, there is a slight clearance between the faces of the disks and the peripheral faces of the friction-wheels. The friction disks are held against undue straining of their connections on the shaft, by the bearings 2 and 2ª.

With the engine operating to turn the disks in the direction indicated by the arrow in Fig. 1, forward or rearward movement of the car will be obtained by using the foot lever 25 or 26. Manipulation of the foot lever 25 will shift the bar 20 thus moving the shift block which will cause the friction wheel to contact with the disk 5. The wheel 10 then acts as a fulcrum and with continued pressure against the bar 20 the wheel 11 will be pressed against the disk 4, thus driving the car forwardly. To obtain a reverse movement of the car the other foot lever being manipulated, the wheel 11 is pressed against the disk 5, and the wheel 10 against the disk 4. It will be observed that in this shifting of the bar 20 and the consequent sliding of one part of the shift block, on the other, that the shafts 6 and 6ª will be moved slightly out of the alinement assumed when in the neutral position. The bearing rings 17, as shown in Fig. 7, and the journal boxes 7 as shown in Fig. 11, being hung pivotally, are always in true alinement with the journals carried therein. The effect at the meeting faces of the friction wheels and disks and at the sprocket wheels 6ᵇ will be inconsiderable. This improved transmission device is capable of easy and economical lubrication. The lubricant is introduced at the top of the upright 27 and will flow down through the perforation 27ª and hole 16ᵇ lubricating the upper mortise joint and the bearing of the bushing on the driving shaft. Through the holes 16ᶜ the lubricant will flow to the lower mortise joint; and through the holes 14ᶜ the lubricant will flow into the bearings of the shafts 6 and 6ª.

By virtue of the positive and direct leverage obtained by my invention, the forces that press the friction wheels into contact with the disks are balanced and counteracting and a friction of powerful tractive force and high efficiency is obtained. The device is self contained and of simple and rugged construction and will withstand the most severe strains without being deranged or injured.

It is obvious that the desired degree of friction may be maintained by locking of the foot lever at proper position. The preferred form of means for operating the shift bar 20 is the arrangement of the two foot levers as shown, the rearward as well as the forward movement of the shift bar 20 being obtained by a forward thrust of the operator's foot; however a connection might be devised whereby a single foot lever would be sufficient, such arrangement however would be not so desirable as that shown herein. To increase the speed of operation of the driven shafts the lever 33 is manipulated. The friction wheels are thus moved apart and toward the peripheral portions of the friction disks and may be held at adjusted positions by locking the hand lever 33.

I am aware that minor changes may be made in the general construction and detailing of the mechanism for carrying out my invention without departing from the spirit of my invention or sacrificing any of its advantages.

What I claim as my invention, and desire to secure by Letters Patent, is—

1. In a transmission device, the combination of a driving shaft, opposed disks secured thereon, a shaft block carried on the driving shaft and between the disks, said shaft block being composed of two parts united but free to be moved slidingly on each other, a pair of driven shafts having their inner ends journaled in the two parts of the shaft block, a shift bar having its one end connected loosely to one of the shaft block parts, a fulcrum bar connected between the shift bar and the other part of the shaft block.

2. In a transmission device, the combination of a driving shaft, opposed disks secured thereon, a shaft block between the disks composed of two parts united but free to be moved slidingly on each other, a pair of driven shafts having their ends journaled in the two sides of the shaft block, friction wheels feathered on said shafts, means to move one part of said shaft block on the other, means carried by the shaft block to vary the distance between the friction wheels, including an upright carried by one of the shaft block parts, a cross arm pivoted on said upright, yokes carried by the hubs of the friction wheels, links between the yokes and the ends of the cross arm, and a lever to move the cross arm.

3. In a transmission device, the combination of a driving shaft, opposed disks thereon, a shaft block carried on the driving shaft and between the disks, said block being composed of two parts united but free to be moved slidingly on each other, a pair of driven shafts having their inner ends journaled in the two parts of the shaft block, friction wheels feathered on said driven shafts, a shift bar having one end pivotally connected to one of the shaft block parts, a fulcrum bar connected between the shift lever and the other part of the shaft block, an upright carried by one of the shaft block parts, a cross arm pivoted on said upright, loosely retained yokes carried by the hubs of the friction wheels, links between the yokes and the ends of the cross arm, a lever to move the cross arm, and means to move and hold the shift bar.

In testimony whereof I affix my signature in presence of two witnesses.

JOHN W. KETTERMAN.

Witnesses:
JOSEPH D. DEULIN,
THOMAS L. RYAN.

Copies of this patent may be obtained for five cents each, by addressing the "Commissioner of Patents, Washington, D. C."